US008993643B2

(12) United States Patent
Theivendran et al.

(10) Patent No.: US 8,993,643 B2
(45) Date of Patent: Mar. 31, 2015

(54) METHODS OF PRODUCING IODINATED ANION EXCHANGE RESINS

(75) Inventors: Sivarooban Theivendran, Reno, NV (US); Terryll Riley Smith, Reno, NV (US); James J. Kubinec, Reno, NV (US)

(73) Assignee: Water Security Corporation, Sparks, NV (US)

( * ) Notice: Subject to any disclaimer, the term of this patent is extended or adjusted under 35 U.S.C. 154(b) by 380 days.

(21) Appl. No.: 13/466,801

(22) Filed: May 8, 2012

(65) Prior Publication Data

US 2013/0299430 A1 Nov. 14, 2013

(51) Int. Cl.
| | |
|---|---|
| C02F 1/42 | (2006.01) |
| B01J 41/12 | (2006.01) |
| B01J 49/00 | (2006.01) |
| C01B 7/14 | (2006.01) |
| C02F 1/76 | (2006.01) |

(52) U.S. Cl.
CPC *B01J 41/12* (2013.01); *B01J 49/00* (2013.01); *C02F 1/42* (2013.01); *B01J 41/125* (2013.01); *B01J 49/0013* (2013.01); *B01J 49/0073* (2013.01); *B01J 49/0082* (2013.01); *C01B 7/14* (2013.01); *C02F 1/766* (2013.01); *C02F 2001/422* (2013.01); *C02F 2303/04* (2013.01); *C02F 2303/16* (2013.01)
USPC .............. 521/27; 521/26; 521/30; 210/670; 210/269

(58) Field of Classification Search
CPC .............. B01J 41/12; B01J 49/00; C02F 1/42
USPC ................ 521/27, 26, 30; 210/670, 269
See application file for complete search history.

(56) References Cited

U.S. PATENT DOCUMENTS

| | | | |
|---|---|---|---|
| 3,817,860 | A | 6/1974 | Lambert et al. |
| 4,131,645 | A | 12/1978 | Keblys et al. |
| 4,187,183 | A | 2/1980 | Hatch |
| 4,190,529 | A | 2/1980 | Hatch |
| 4,238,477 | A | 12/1980 | Lambert et al. |
| 4,420,590 | A | 12/1983 | Gartner |
| 4,999,190 | A | 3/1991 | Fina et al. |
| 5,176,836 | A | 1/1993 | Sauer et al. |
| 5,314,968 | A | 5/1994 | Frommer et al. |
| 5,624,567 | A | 4/1997 | Columbo |
| 6,506,737 | B1 | 1/2003 | Hei et al. |
| 6,592,861 | B2 | 7/2003 | Messier |
| 2003/0138395 | A1 * | 7/2003 | Messier ............ 424/78.1 |
| 2011/0226706 | A1 | 9/2011 | Theivendran et al. |
| 2012/0199540 | A1 | 8/2012 | Theivendran et al. |
| 2013/0200008 | A1 | 8/2013 | Theivendran et al. |

FOREIGN PATENT DOCUMENTS

RU  2266927 C2 * 12/2005

OTHER PUBLICATIONS

J. L. Lambert, et al., "Preparation and Properties of Triiodide-, Pentaiodide-, and Heptaiodide-Quaternary Ammonium Strong Base Anion-Exchange Resin Disinfectants," *Ind. Eng. Chem. Prod. Res. Dev.* 1980, 19, 256-258.
G. L. Hatch et al., "Some Properties of the Quaternary Ammonium Anion-Exchange Resin-Triiodide Disinfectant for Water," *Ind. Eng. Chem. Prod. Res. Dev.* 1980, 19, 259-263.
I. Samemasa et al., "Uptake of Iodine and Bromine by Ion-Exchange Resins in Aqueous Solution," *Analytical Sciences*, 2008, 24, 921-924.
J. L. Lambert, et al., "Iodide and Iodine Determination in the Parts-per-Billion Range with Leuco Crystal Violet and N-Chlorosuccinimide-Succinimide Reagents," Analytical Chemistry, 1975, 47, 915-916.
G. L. Hatch, "Preparation of Iodinated Anion-Exchange Resins for the Controlled Release of Disinfecting Levels of Iodine and Hypoiodous Acid," *Ind. Eng. Chem. Prod. Res. Dev.* 1981, 20, 382-385.
J. E. Atwater et al., "Regenerable Microbial Check Valve: Life Cycle Tests Results," SAE Technical Paper Series, paper 921316, presented at the 22$^{nd}$ International Conference on Environmental Systems, Jul. 13-16, 1992.
U.S. Army Public Health Command, "Iodine Disinfection in the Use of Individual Water Purification Devices," Technical Information Paper #-31-005-0211, Dated Mar. 2006, updated Jan. 2011.
"4500-I Iodine" in *Standard Methods for the Examination of Water and Wastewater*, A. D. Eaton et al., ed., 2005, pp. 4-70 to 4-71 and 4-97 to 4-99.
W. Gottardi, Chapter 8, "Iodine and Iodine Compounds" in Disinfection, Sterilization, and Preservation, 5$^{th}$ ed. S.S. Block ed., Lippincott Williams & Wilkins, 2001, pp. 159-183.
4500-CI G. DPD Colorimetric Method in *Standard Methods for the Examination of Water and Wastewater*, A. D. Eaton et al., ed., 2005, pp. 4-67 to 4-68.

* cited by examiner

*Primary Examiner* — Michael M Bernshteyn
(74) *Attorney, Agent, or Firm* — K&L Gates LLP

(57) ABSTRACT

Methods for producing or regenerating an iodinated anion exchange resin are presented. The methods include treating an iodide loaded anionic resin with an aqueous solution comprising an in situ formed I2 to produce the iodinated resin. The iodinated resins show reduced and stable levels of iodine elution compared to resins produced by conventional methods. Methods and systems for purifying water are also presented.

21 Claims, 7 Drawing Sheets

FIG. 6B

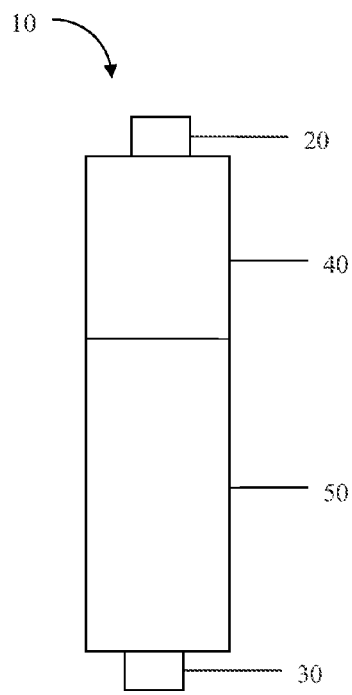

FIG. 6C

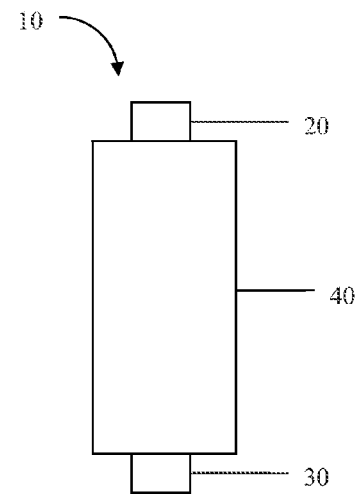

FIG. 7

| Preparing an iodinated anion exchange resin by treating an iodide loaded anion exchange resin with an aqueous solution comprising in situ formed $I_2$, wherein the $I_2$ is formed in situ by reacting a soluble iodide salt with a source of molecular halogen in aqueous solution |

↓

| Positioning a iodinated anion exchange resin intermediate an inlet and an outlet |

↓

| Positioning a chitosan-based material and or a scavenger barrier intermediate the iodinated anion exchange resin and the outlet |

METHODS OF PRODUCING IODINATED ANION EXCHANGE RESINS

FIELD OF TECHNOLOGY

The present disclosure relates to methods for producing iodinated anion exchange resins. The resins may be incorporated into water treatment systems.

BACKGROUND

Over one billion people lack access to reliable and sufficient quantities of safe or potable drinking water. Waterborne contaminants pose a critical health risk to the general public, including vulnerable populations, such as children, the elderly, and those afflicted with disease, if not removed from drinking water. An estimated six million people die each year, half of which are children under 5 years of age, from contaminated drinking water. The U.S. Environmental Protection Agency Science Advisory Board considers contaminated drinking water one of the public's greatest health risks.

Many people rely on groundwater as their only source of water. Groundwater was believed to be relatively pure due to its percolation through the topsoil; however, research has shown that up to 50% of the active groundwater sites in the United States test positive for waterborne contaminants. Waterborne contaminants may include microorganisms, including viruses, such as enteroviruses, rotaviruses and other reoviruses, adenoviruses Norwalk-type agents, other microbes including fungi, bacteria, flagellates, amoebae, Cryptosporidium, Giardia, other protozoa, prions, proteins and nucleic acids, pesticides and other agrochemicals, including organic chemicals, inorganic chemicals, halogenated organic chemicals and other debris. Accordingly, the removal of waterborne contaminants may be necessary to provide potable drinking water for the general public; water for emergency use during natural disasters and terrorist attacks; water for recreational use, such as hiking and camping; and water for environments in which water must be recirculated, such as aircraft and spacecraft.

Iodinated resins have been shown to effectively reduce viral or bacterial contaminants in treated water. However, conventional iodinated cationic exchange resins may display very high initial iodine ($I_2$) elution and/or water temperature and/or pH dependent activity. This leads to premature iodine leading from iodine scavenging anion exchange resins downstream from the iodinated resin, as well as high iodine loading in the scavenging resins. In addition, the high initial leakage can lead to reduced iodine levels after extended usage and concomitant reduced microbiological performance. Thus, commercial iodinated resins can be expensive, due to higher iodine cost and longer production processing times. Therefore, improved iodinated resins and methods for forming the resins would be desirable.

BRIEF DESCRIPTION

Various embodiments of the present disclosure relate to methods for producing iodinated anion exchange resins and methods and systems for water purification.

A first embodiment of the present disclosure provides a method for producing an iodinated anion exchange resin. The method comprises treating an iodide loaded anion exchange resin with an aqueous solution comprising in situ formed iodine ($I_2$) to produce an iodinated anion exchange resin, wherein the $I_2$ is formed in situ by reacting a soluble iodide salt with a source of a molecular halogen in an aqueous solution.

Other embodiments of the present disclosure provide methods for producing an iodinated anion exchange resin comprising treating a chloride form anion exchange resin with an aqueous solution of a first soluble iodide salt to form an iodide loaded anion exchange resin, forming an aqueous solution of iodine ($I_2$) in situ in the by reacting an aqueous solution of a soluble iodide salt with a source of molecular chlorine ($Cl_2$), and treating the iodide loaded anion exchange resin with the aqueous solution of in situ formed $I_2$ to produce an iodinated anion exchange resin.

Still other embodiments of the present disclosure provide methods for regenerating a used iodinated anion exchange resin. The method comprises treating a used iodinated anion exchange resin with an aqueous solution of a first soluble iodide salt to form an iodide loaded used anion exchange resin, and treating the iodide loaded used anion exchange resin with an aqueous solution comprising in situ formed iodine ($I_2$) to produce a regenerated iodinated anion exchange resin, wherein the $I_2$ is formed in situ by reacting a soluble iodide salt with a source of a molecular halogen in an aqueous solution.

Still further embodiments of the present disclosure provide methods for treating water comprising: eluting the water comprising at least one contaminant through an iodinated anion exchange rein prepared or regenerated by a process comprising treating an iodide loaded anion exchange resin with an aqueous solution comprising in situ formed iodine ($I_2$) to form the iodinated anion exchange resin, wherein the $I_2$ is formed in situ by reacting a soluble iodide salt with a source of a molecular halogen in an aqueous solution.

Additional embodiments of the present disclosure provide a water treatment system comprising at least one column or compartment comprising an iodinated anion exchange resin prepared or regenerated by a process comprising treating an iodide loaded anion exchange resin with an aqueous solution comprising in situ formed iodine ($I_2$) to form the iodinated anion exchange resin, wherein the $I_2$ is formed in situ by reacting a soluble iodide salt with a source of a molecular halogen in an aqueous solution.

DESCRIPTION OF THE DRAWINGS

The various embodiments described herein may be better understood by considering the following description in conjunction with the accompanying drawings.

FIGS. 6A-6C include illustrations of several embodiments of the water treatment system described herein.

FIG. 7 illustrates one embodiment of a method for manufacturing a water treatment system as described herein.

DETAILED DESCRIPTION

Figure 1:
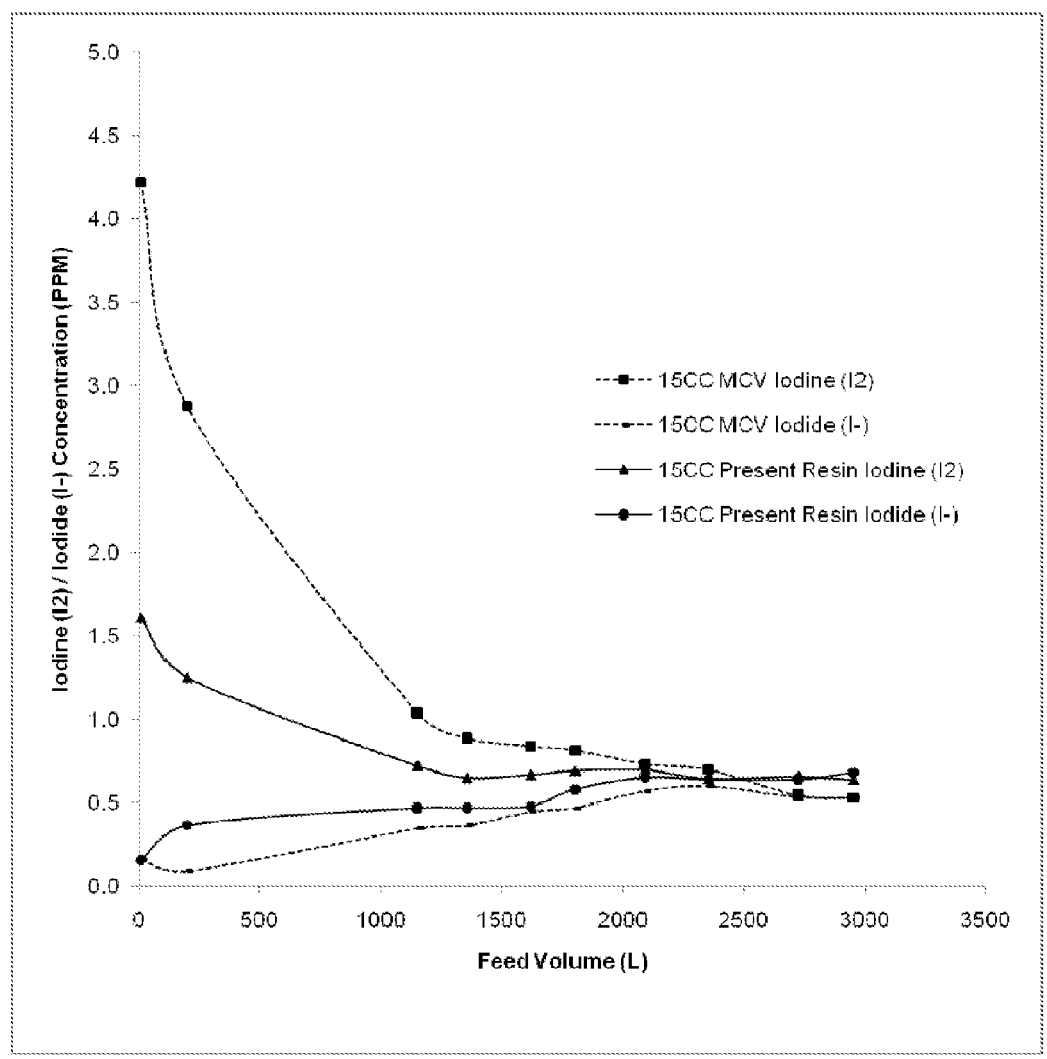
FIG. 1 illustrates comparative iodine ($I_2$)/Iodide ($I^-$) elution profiles of 15 cc of commercially available MCV® Iodinated resin and 15 cc of resin prepared according to an embodiment herein. Elution was at 23° C., flow rate 160 mL/min, empty bed contact time (EBCT) 5.62 sec. using feed water of de-chlorinated tap water.

Embodiments of the present disclosure provide for methods of producing improved iodinated anion exchange resins. The iodinated resins may display reduced iodine leakage and superior lifetime over iodinated anion exchange resins prepared by conventional methods. In certain embodiments, the described methods may also be used to regenerate a used iodinated. The iodinated resins may be used to treat water to remove biological contaminants, such as viral, bacterial, microbial, and/or fungal contaminants. According to various embodiments, the resulting iodinated anion exchange resins display a flat iodine and iodide elution profile during the performance of the resin, while using lower amounts of iodine containing raw materials.

As generally used herein, the terms "include" and "have" mean "comprising".

As generally used herein, the term "about" refers to an acceptable degree of error for the quantity measured, given the nature or precision of the measurements. Typical exemplary degrees of error may be within 20%, 10%, or 5% of a given value or range of values. Alternatively, and particularly in biological systems, the term "about" may mean values that are within an order of magnitude, potentially within 5-fold or 2-fold of a given value.

All numerical quantities stated herein are approximate unless stated otherwise, meaning that the term "about" may be inferred when not expressly stated. The numerical quantities disclosed herein are to be understood as not being strictly limited to the exact numerical values recited. Instead, unless stated otherwise, each numerical value is intended to mean both the recited value and a functionally equivalent range surrounding that value. At the very least, and not as an attempt to limit the application of the doctrine of equivalents to the scope of the claims, each numerical parameter should at least be construed in light of the number of reported significant digits and by applying ordinary rounding techniques. Notwithstanding the approximations of numerical quantities stated herein, the numerical quantities described in specific examples of actual measured values are reported as precisely as possible.

All numerical ranges stated herein include all sub-ranges subsumed therein. For example, a range of "1 to 10" is intended to include all sub-ranges between and including the recited minimum value of 1 and the recited maximum value of 10. Any maximum numerical limitation recited herein is intended to include all lower numerical limitations. Any minimum numerical limitation recited herein is intended to include all higher numerical limitations.

As used herein, the term "molecular halogen" refers to elements for the group 17 column of the periodic table having a molecular formula of $X_2$, where X is one of F, Cl, Br, or I. Examples of molecular halogens include $Cl_2$ and $Br_2$. Halogen producing compounds include compounds that release a halogen into aqueous systems. As used herein, the term "iodine" means molecular iodine with a formula $I_2$. As used herein, the term "halide" refers to the anionic form of a halogen atom, represented by $X^-$. Examples of halide ions include chloride ($Cl^-$), bromide ($Br^-$) and iodide ($I^-$).

As used herein, the term "anion exchange resin" refers to a polymeric resin having an insoluble matrix or support structure, normally in the form of beads, particles, particulates, or powder, fabricated from an organic polymer structure. The polymeric structure has active cationic sites incorporated into the structure. These active sites can reversibly bind to anions. Suitable active cationic sites include chloride form strong base ion exchange resins, such as quaternary trialkylammonium sites ($-NR_3^+$), dialkylammonium sites ($-NHR_2^+$), alkylammonium sites ($-NH_2R^+$), and ammonium sites ($-NH_3^+$) as well as other cationic active sites. There are other types of quaternary ammonium resins with different and unique functional groups, but the primary commercially available resins are the strong base, quaternary ammonium resins using DVB as the crosslinking agent. Certain suitable resins of these are the "type I" (trimethylammonium) and "type II" (dimethylethanol ammonium) functional groups. Other available suitable anion exchange resins may include, but are not limited to, chemically analogous or similar 'strong base' resins with a positively charged functional site such as tertiary sulfonium, quaternary phosphonium and alkyl pyridinium containing anion exchange resins. One of skill in the art would understand that other strong base anion exchange resins currently available or developed in the future could be readily substituted for the resins described herein without departing from the scope and intent of the present disclosure.

As used herein, the term "soluble iodide salt" means an ionic salt comprising at least one iodide ($I^-$) ion and at least one suitable metal countercation, such that the soluble iodide salt sufficiently dissociates in aqueous solution to form an aqueous solution. Suitable metal countercations include alkali metal cations, alkaline earth metal cations, transition metal, and metals or metalloids in the 13, 14, and 15 column of the Periodic Table of Elements.

As used herein, the term "in situ" means that the iodine ($I_2$) is formed in solution by a chemical reaction, rather than, for example, by a physical dissolution process.

As used herein, the term "iodide loaded anion exchange resin" means an anion exchange resin in which the active sites substantially comprise iodide ($I^-$) ions, for example, at least 70%, at least 80%, at least 90%, or even at least 95% of the active sites comprise $I^-$ ions.

As used herein, the term "iodinated anion exchange resin" means an anion exchange resin having predominantly short chain iodine moieties, such $I_3^-$ and $I_5^-$, at the active sites on the resin. In certain embodiments, the iodinated anion exchange resin may have predominantly $I_3^-$ moieties at the active sites of the resin.

As used herein, the term "iodine leakage" refers to the elution of iodine ($I_2$) from the resin as water is flowed through the resin. Iodine leakage may be measured as concentration in the water effluent in parts-per-million (ppm). Leakage of iodine from an anion exchange resin should be minimized, for example, to ensure longer resin active lifetime, reduce iodine loading on downstream iodine scavenging media and activated carbon, and prevent iodine in the treated water due to saturation of iodine scavenging media.

As used herein, the phrases "Log Removal" and "Log reduction value" refer to the $Log_{10}$ of the ratio of the level of contaminants (typically the number of microorganisms) in the influent to the level of contaminants (typically the number of microorganisms) in the effluent.

As used herein, "to reduce contaminants" and "reducing contaminants" refer to disarming one or more contaminants in the fluid, whether by physically or chemically killing, removing, reducing, or inactivating the contaminants or otherwise rendering the one or more contaminants harmless.

In the following description, certain details are set forth to provide a thorough understanding of various embodiments of the apparatuses and/or methods described herein. However, a person having ordinary skill in the art will understand that the various embodiments described herein may be practiced without these details. In other instances, well-known structures and methods associated with the apparatuses and/or methods described herein may not be shown or described in detail to avoid unnecessarily obscuring descriptions of the embodiments described herein.

This disclosure describes various features, aspects, and advantages of various embodiments of water treatment systems as well as methods of making and using the same. It is understood, however, that this disclosure embraces numerous alternative embodiments that may be accomplished by combining any of the various features, aspects, and advantages of the various embodiments described herein in any combination or sub-combination that one of ordinary skill in the art may find useful.

Any patent, publication, or other disclosure material, in whole or in part, recited herein is incorporated by reference herein but only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

The present disclosure provides novel and inventive methods for producing an iodinated anion exchange resin. The iodinated anion exchange resin produced according to the various embodiments herein display improved lifetime, reduced iodine leakage, and extended microbiological performance compared to iodinated anion exchange resins prepared by conventional methods. In addition, the iodinated anion exchange resins have a more stable iodine elution independent of temperature and/or pH, compared to iodinated resins prepared by conventional methods. Further, the methods are cost effective, producing the improved iodinated resins while requiring up to 25% less iodine for preparation of the iodinated resins, having shorter processing times (up to 75% less time to produced the iodinated resin), result in less loading of iodine on the downstream iodine scavenging materials, all while providing equivalent or better pathogen removal at extended usage times, compared to iodinated resins prepared by conventional methods.

Conventional iodinated anion exchange resins are prepared by treating an anion exchange resin with a solution prepared by adding iodine crystals to the solution of an iodide salt to first convert the active sites to iodide sites and then bind the iodine to form the iodinated anion exchange resin (see for example, U.S. Pat. Nos. 4,238,477; 4,420,590; and 4,999,190). However, the convention process can result in an iodinated resin having long poly-iodide chains on at least a portion of the active sites. For iodinated resins, the inventors have determined that it is preferred that the active sites are functionalized with short poly-iodide chains, such as $I_3^-$ chains. Without intending to be limited by any theory, it is believed that resins with longer poly-iodide chains, such as $I_5^-$, $I_7^-$, $I_9^-$, etc., at the active sites can result in increased iodine elution by a mechanism in which the longer poly-iodide are removed at the early stage of the wash-out. The resulting elution profile is shown in Scheme 1. The long poly-iodide chains result in an initial high-iodine ($I_2$) release that cannot be controlled. FIG. 1 illustrates the iodine ($I_2$)/iodide (I-) elution profiles of commercially available MCV® iodinated resin (commercially available from MCV Manufacturing Inc., Sparks, Nev.) prepared by conventional methods and the iodine ($I_2$)/iodide (I-) elution profiles of resin prepared according to an embodiment described herein. Initial iodine elution for MCV® resin is greater than 2 ppm for about the first 500 L of feed volume whereas the iodinated resin prepared herein displays a substantially flat $I_2$ elution profile, less than 2 ppm and even less than 1.5 ppm, over the entire elution volume. It is believed by the inventors that the long poly-iodide functionality at the resin active sites is produced, at least in part, by the extended processing times required for resin loading using iodine crystals during conventional processing methods. It is also believed that the long term iodine loading using crystalline $I_2$ results in long poly-iodide chain formation while not saturating all the available active sites on the resin.

$$I_9^- \rightarrow I^- + 4I_2$$

$$I_7^- \rightarrow I^- + 3I_2$$

$$I_5^- \rightarrow I^- + 2I_2$$

Scheme 1

Long Poly-Iodine Chain Iodine Elution Profile

The present disclosure provides methods for producing iodinated resin in which the active sites of the iodinated resins are initially predominantly loaded with short poly-iodide chains, such as $I_3^-$ and $I_5^-$. This is accomplished using the novel and inventive loading chemistry which includes in situ formation of iodine ($I_2$) in an aqueous solution and having a shortened processing time to provide effective loading with the desired site saturation.

According to one embodiment, the present disclosure provides a method for producing an iodinated anion exchange resin. The method comprises treating an iodide loaded anion exchange resin with an aqueous solution comprising in situ formed iodine ($I_2$) to produce the iodinated anion exchange resin. According to various embodiments, iodine ($I_2$) may be formed in situ in the aqueous solution by reacting a soluble iodide salt with a source of a molecular halogen in an aqueous solution via a redox reaction, as shown in equation 1.

$$2M^+I^-(aq) + X_3(aq) \rightarrow I_2(aq) + 2M^+X^-(aq) \text{ (where X is Cl or Br)} \quad \text{eq. 1}$$

The in situ formed $I_2$ may be formed in the presence of the iodide loaded anion exchange resin. For example, the iodide loaded anion exchange resin may be placed in an aqueous solution of the iodide salt and then the source of molecular halogen may be added to produce the iodine in situ in the presence of the resin. In another embodiment, the in situ iodine may be formed in solution and the solution thereafter may be exposed to the iodide loaded anion exchange resin, for example in a batch-wise or continuous process, for example, by flowing the solution of in situ formed iodine over a bed of the resin. The in situ formed $I_2$ can then react with $I^-$ anions in the active site of the resin to produce predominantly short poly-iodide chain groups, such as $I_3^-$ and $I_5^-$. In certain embodiments, the in situ formed $I_2$ reacts with $I^-$ anions at the active sites of the resin to produce predominantly $I_3^-$ groups. As used herein, the term "predominantly" when used in conjunction with loading of the active sites of the resin means at least 70% of the active sites, or in other embodiments, at least 80%, and in still other embodiments, at least 90% or even at least 95% of the active sites. Forming the iodine in situ allows for reduced processing time, since dissolving crystalline iodine ($I_2$(s)) into aqueous solution and subsequent iodine loading the anion exchange resin requires additional time exposure of the resin to the aqueous solution.

According to these methods, the in situ formation of aqueous iodine may be formed using any suitable soluble iodide salt. In certain embodiments, the soluble iodide salt may be selected from the group consisting of an alkali metal iodide salt, an alkaline earth metal iodide salt, a transition metal iodide salt, and mixtures of any thereof. In certain embodiments, the soluble iodide salt may be an alkali metal iodide salt. In specific embodiments, the soluble iodide salt may be potassium iodide (KI), sodium iodide (NaI), or a mixture thereof. The iodide salt may be in the form of an aqueous solution, where the aqueous solution has an iodide concentration of from about 1% to about 50% by weight, or in other embodiments from about 15% to about 40% by weight, or even about 20%. Lower concentrations of iodide solutions can be used with greater volume. In general, the iodine saturation level in aqueous solution is around 300 ppm. According to the present method, when adding TCCA in 20% KI solution, the produced iodine ($I_2$) immediately adsorbed by the resin bead. For example, according to one theory 20% KI solution 100 mL can make 15 g iodine ($I_2$) in situ when there is about 4.2 g of 100% chlorine. Since in certain embodiments, the chlorine source, such as TCCA, may not release 100% chlorine, condition may require excess TCCA or other chlorine source. In contrast, in the conventional procedure for loading resin using iodine crystal, it is possible to dissolve iodine crystal to a maximum of about 300 ppm, however, the iodine will then gradually adsorbed by the resin. Thus, the conventional process requires significantly more time for iodine loading of the resin since first the iodine must dissolve into the water and then be adsorbed by the resin.

According to various embodiments, the aqueous solution of iodide salt may be reacted by a redox reaction with a source of molecular halogen. In certain, embodiments, the source of molecular halogen may produce molecular chlorine ($Cl_2$) or molecular bromine ($Br_2$). In specific embodiments, the source of molecular halogen may be a source of molecular chlorine ($Cl_2$). As shown in equation 1, the source of molecular halogen is added in a concentration to provide sufficient molecular halogen to react with the iodide, for example in a ratio of 2:1 iodide to molecular halogen. In specific embodiments, the concentration of the molecular halogen produced by the source of molecular halogen will range from about 1% to about 10% by weight or in other embodiments from about 5% to about 10% by weight. While higher halogen concentrations may be used, at higher concentrations of molecular halogen, solubilized $I_2$ may be produced in quantities larger than can be readily adsorbed by the resin which may lead to evaporation of excess $I_2$ from the solution. Suitable sources of molecular chlorine include, but are not limited to chlorine producing sources selected from the group consisting of chlorine gas, liquid chlorine, trichloroisocyanuric acid (TCCA), sodium dichloroisocyanurate (DCCA) or other soluble DCCA salts, sodium hypochlorite, calcium hypochlorite, hypochlorous acid, chlorine dioxide, and combinations of any thereof. In one embodiment, the source of molecular halogen may be trichloroisocyanuric acid. For example, TCCA may be added to a solution of iodide salt with a total added TCCA concentration of from about 1% to about 10% by weight. While the maximum concentration TCCA can form only 1.2% (12 g/L), larger amounts may be added since reaction with the soluble iodide removes the TCCA from solution. According to certain embodiments, 7 g of TCCA solid may be gradually added to about 100 mL of KI solution to form $I_2$ in situ.

According to certain embodiments, a slurry of the iodide loaded anion exchange resin in the aqueous solution of the iodide salt is treated with the molecular halogen source, such as by slowly adding TCCA solid to the solution with stirring. In certain embodiments, the reaction mixture is stirred at a temperature ranging form about 20° C. to about 40° C. for a time ranging from about 5 min to about 60 min, although one of skill in the art would understand that reaction time and temperature may vary due to concentration of the reactants. The process of treating the resin with in situ iodine may be repeated, for example two or more additional times, to ensure complete iodination of the resin iodide site. The iodinated resin may then be removed from the reaction solution and washed with de-ionized water to remove any residuals. In certain embodiments, the prepared resin may be run in a small column and determined the iodine ($I_2$) and iodide ($I^-$) concentration on the resin. According to various embodiments, the iodine ($I_2$) concentration may be approximately 1.0-2.0 ppm range. If iodide concentration is higher than about 0.5 ppm, it is possible to add more TCCA/chlorine source and tumble for another 20 minute to ensure complete iodine loading. After iodine loading the resin is checked for iodide elution. If the Total Iodine (TI) concentration is lower than the iodine ($I_2$) concentration, then the resin may be checked for the presence of chlorine. If there is any residual chlorine found, the resin may be saturated with excess iodide solution to react with excess chlorine. According to certain embodiments, the resulting resin will not have high levels of residual chlorine or iodide. Chlorine levels in the effluent may be determined using standard methods, such as 4500-Cl G. DPD Colorimetric Method, as described in Standard Methods For the Examination of Water & Wastewater, 21st ed., American Public Health Assoc., 2005 at 4-67 to 4-68.

In one embodiment, the method for in situ formation of aqueous iodine may include reaction of sodium or potassium iodide with molecular chlorine produced by addition of TCCA to the aqueous solution. The resulting chemical reaction is shown in equations 2 and 3.

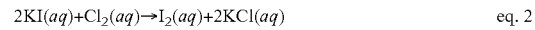

$$2KI(aq) + Cl_2(aq) \rightarrow I_2(aq) + 2KCl(aq) \qquad \text{eq. 2}$$

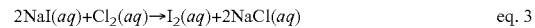

$$2NaI(aq) + Cl_2(aq) \rightarrow I_2(aq) + 2NaCl(aq) \qquad \text{eq. 3}$$

The aqueous iodine may be rapidly formed in situ by reacting the iodide salt with the source of molecular halogen in the presence of the iodide loaded anion exchange resin. The in situ formed iodine may be adsorbed onto the resin at the iodide active sites to form small or limited poly-iodide chains, such as initially $I_3^-$ chains, which in certain cases may add a second iodine to form $I_5^-$ chains. Because the concentration of the in situ formed iodine can be more readily controlled, lower concentrations of in situ iodine may be prepared using lower amounts of iodine, compared to conventional processes. The lower amount of iodine results in a lower iodine load on the ion exchange resin which can limit poly-iodide chain formation. Further, because the in situ loading process is shorter and the resin is exposed to aqueous iodine for much shorter periods, formation of long chain poly-iodide moieties is reduced. It is believed by the inventors that because the in situ iodine is formed rapidly and can react quickly with the available active I⁻ sites. As a result, it is believed that the iodide loaded anion exchange resin has a more uniform and complete adsorption of the iodide and by controlling the reaction process, such as, but not limited to temperature and reactant concentration, long poly-iodide chains can be avoided and the resulting iodinated resin will have predominantly $I_3^-$ chains with some $I_5^-$ chains.

Iodinated anion exchange resins produced according to the methods described herein may be produced using less iodine that convention methods for producing iodinated resins (such as using aqueous solutions formed by dissolving crystalline $I_2$). For example, the iodinated resins may be produced using up to 30% by weight less iodine and in certain embodiments, at least 20% weight, as calculated from the amount of iodide salt reacted, that conventional methods for producing iodinated resins. Without intending to be limited by any theory, it is believed that less iodine is needed because in situ formation of the aqueous iodine results in rapid iodination of the iodide active sites and formation of shorter poly-iodide chains. For example, according to the present methods, processing times for the iodinated resins can be reduced by up to 75% compared to conventional methods for producing iodinated resins. In one embodiment, processing iodide loaded resin with aqueous in situ formed iodine solution according to the present methods may take up to about 5 hours, compared to about 20 hours for iodine loading using conventional crystalline iodine methods. Further, the resulting iodinated resin has lower iodine content that iodinated resins prepared by conventional means, for example, up to about 25% less iodine compared to conventional resins, while displaying comparable or improved viral and other microbial kill values. In addition, because the iodinated resins prepared by the methods herein display lower levels of iodine leakage, the useful lifetime of the iodinated anion exchange resin is comparable or better than iodinated resins prepared by conventional methods.

In various embodiments, in situ formation of iodine may result in halide ions, such as chloride ions (Cl⁻) or bromide ions (Br⁻) formed during the reaction. In certain embodiments, it may be desired to remove or limit the Cl⁻ and/or Br⁻ ion concentration in the reaction medium. For example, excess Cl⁻ or Br⁻ ions in the reaction may interfere with and/or exchange with the iodide ion on the iodide loaded anion exchange resin. Therefore, in certain embodiments, the aqueous solution of in situ formed iodine ($I_2$) may further comprise at least one Cl⁻ and/or Br⁻ ion scavenger compound. Suitable Cl⁻ or Br⁻ ion scavenger compounds include silver ions or lead ions or ion exchange resins designed to remove Cl⁻ or Br⁻ ions. Chloride levels in the effluent may be determined by measuring the stoichiometric ratios of reactants in the reaction medium.

Halide production during iodination may be minimized by performing the process in a step-wise process where the resin is treated multiple times with the iodide salt and chlorine source. For example, by treating the resin to two, three or more processes of in situ iodine formation (i.e., KI plus TCCA), the halide production is minimized. Alternatively, the resin may be treated to in situ formed iodine in a continuous flow process. By treating the resin with in situ formed iodine and then removing the supernatant, any residual chloride or bromide is removed with the supernatant. This may allow for the reduction of the use of a Cl⁻ or Br⁻ scavenger compound, such as silver or lead ions with a concomitant cost savings.

Other methods for in situ production of aqueous iodine may also be suited for the various methods of the present disclosure. Methods such as other redox processes to produce in situ the aqueous iodine from a soluble iodide salt, such as, electrochemical methods, electrolytic methods, and electron transfer methods, are also contemplated and are to be considered to be within the scope of the present disclosure.

Other embodiments of the methods of the present disclosure may further comprise the step of first treating an anion exchange resin with an aqueous solution of a first soluble iodide salt to form the iodide loaded anion exchange resin. According to these embodiments, an anion exchange resin, such as a strong base anion exchange resin, for example, a resin having quaternary ammonium active sites, having non-iodine counteranions, such as chloride counteranions, may be treated with an aqueous solution of a first soluble iodide salt to form the iodide loaded anion exchange resin. For example, in one embodiment, a chloride form strong base anion exchange resin may be treated with an aqueous solution of a first soluble iodide salt, such as potassium iodide (KI), sodium iodide (NaI) or a combination thereof. Other soluble iodide salts may also be utilized to load the anion exchange resin with iodide. In one embodiment, the resin is treated with an aqueous solution of a first soluble iodide salt having an iodide concentration ranging from 1% to 50% by forming a slurry of the resin in the solution and stirring at a temperature ranging from about 20° C. to about 40° C. for a time ranging from about 5 min to about 60 min. The treatment process may be repeated two or more times. The loaded anion exchange resin may then be removed from the reaction solution and washed with deionized water and optionally analyzed for iodine and iodide concentration.

Figure 2:
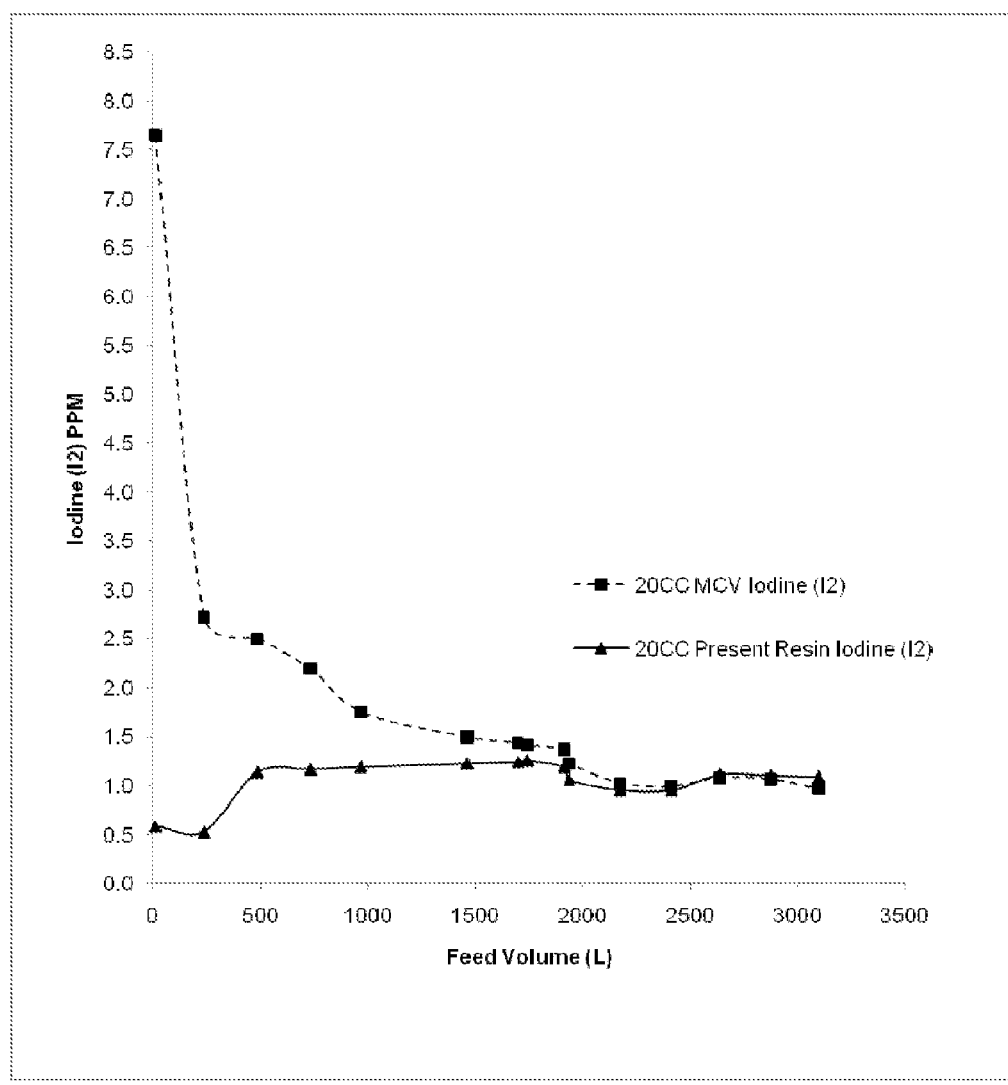
FIG. 2 illustrates comparative iodine ($I_2$) elution profiles of 20 cc of commercially available MCV® Iodinated resin and 20 cc of resin prepared according to an embodiment herein. Elution was at 23° C., flow rate 178 mL/min, empty bed contact time (EBCT) 6.75 sec. using feed water of de-chlorinated tap water.
Figure 3:
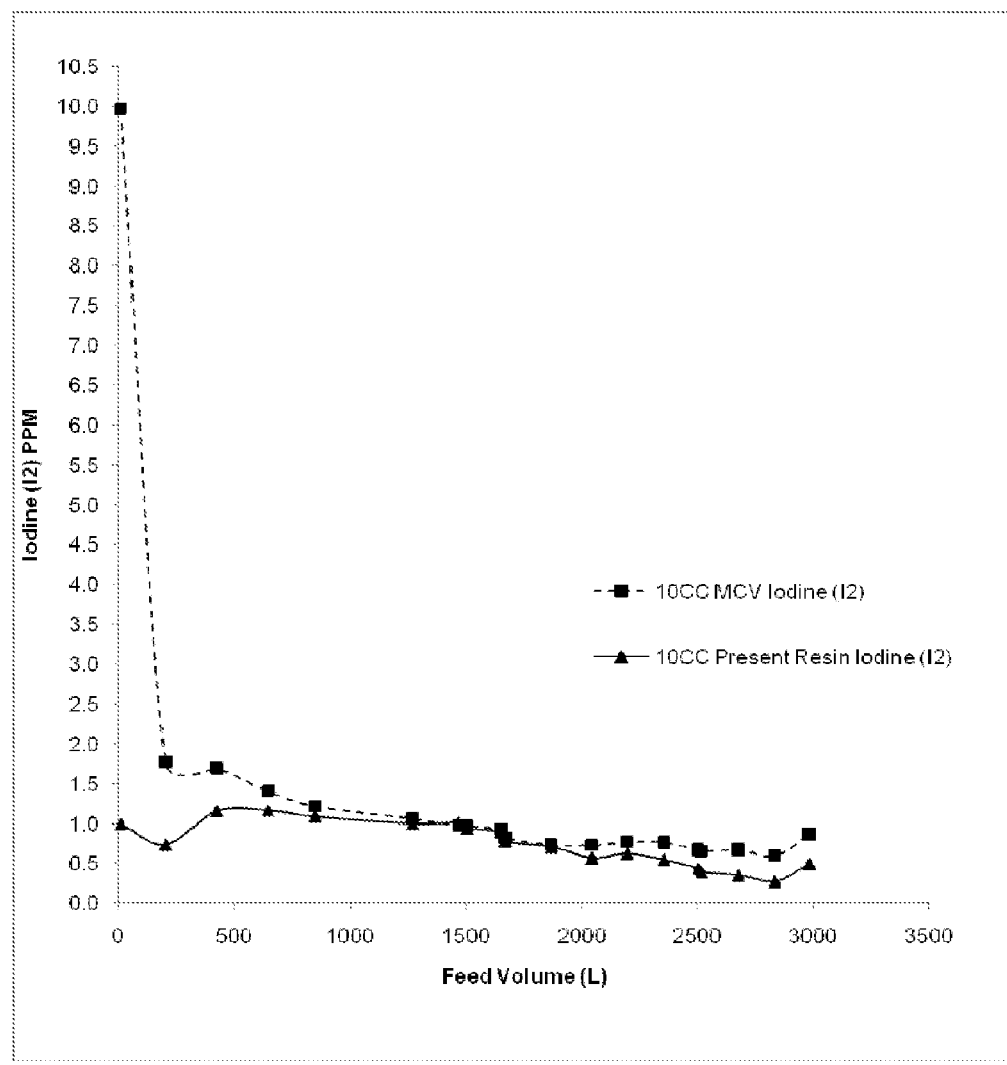
FIG. 3 illustrates comparative iodine ($I_2$) elution profiles of 10 cc of commercially available MCV® Iodinated resin and 10 cc of resin prepared according to an embodiment herein. Elution was at 23° C., flow rate 160 mL/min, empty bed contact time (EBCT) 3.75 sec. using feed water of de-chlorinated tap water.

According to the various methods for producing the iodinated anion exchange resin recited herein, the iodinated resin displays a flat iodine elution profile over the entire elution of water through the iodinated resin. Iodinated anion exchange resins prepared using conventional processes may display initial high values of iodine elution, for example during the first 500 L to 1000 L of water elution through the conventional iodinated resins. As previously discussed, this is believed to be due to higher concentrations of long poly-iodide chains on the conventional resins. Higher concentrations of long poly-iodide chains in conventional resins also lead to higher costs (due to more iodine raw material and requirement for additional iodine scavenging layer downstream) and higher iodine concentrations than are necessary to achieve necessary kill rates of microbes. In contrast, iodinated resins prepared by the various embodiments of the methods herein display an iodine leakage of less than about 2 ppm during the entire elution of water through the iodinated anion exchange resin and in certain embodiments, less than about 1.5 ppm. FIG. 2 displays comparative iodine elution profiles of 20 cc of commercially available MCV® iodinated resin compared to 20 cc of a resin prepared by the methods described herein at 23° C. As can be seen in the FIG. 2 elution profiles, the commercial resin displays initial high concentrations of iodine leakage (greater than 7 ppm) which remains greater than 2 ppm for the first 500 L to 600 L elution. In contrast, the resin prepared by the methods herein display a relatively flat elution profile which iodine leakage concentrations of less than 2 ppm, or even less than 1.5 ppm, over the entire elution volume. FIG. 3 displays comparative iodine leakage for a system with 10 cc of MCV® iodinated resin versus 10 cc of iodinated resin prepared to the disclosure herein. Similar results are observed for lower resin volumes and empty bed contact times (EBCT).

Figure 4:
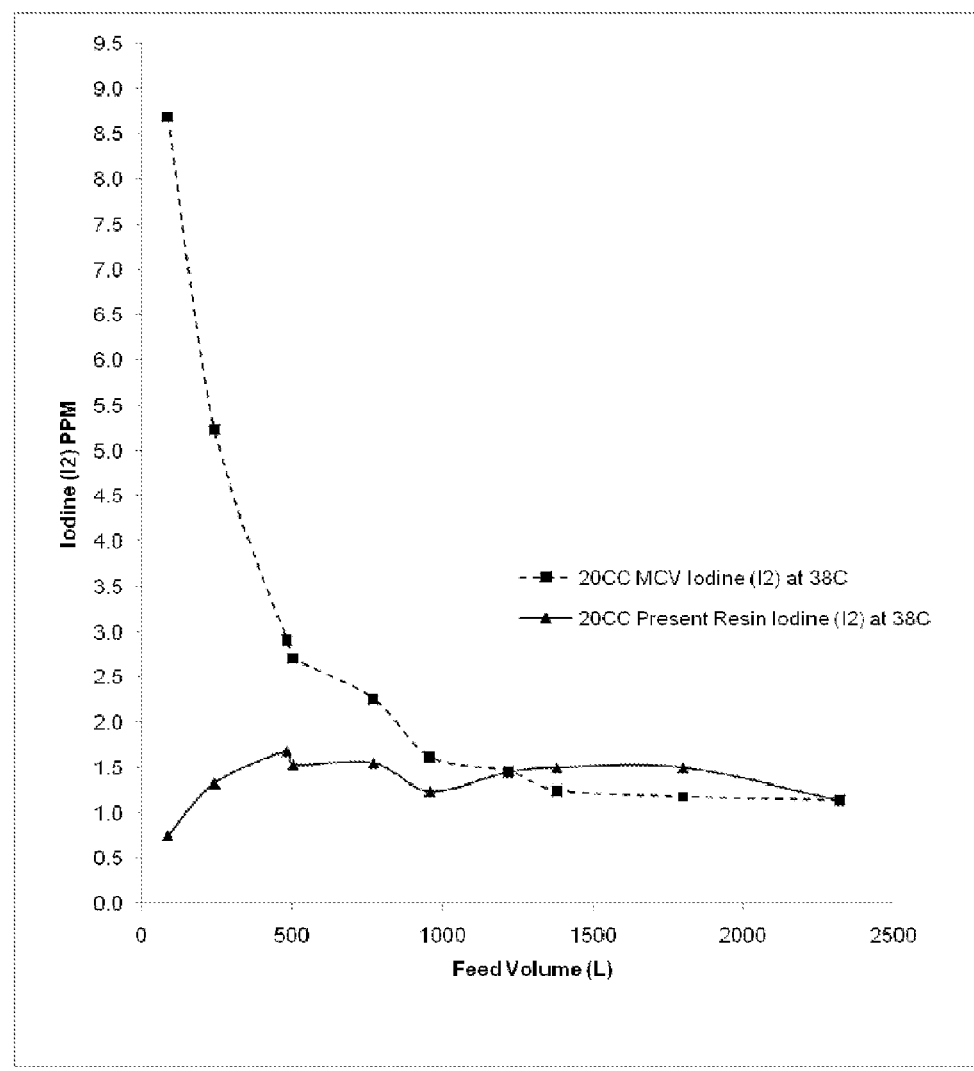
FIG. 4 illustrates comparative iodine ($I_2$) elution profiles of 20 cc of commercially available MCV® Iodinated resin and 20 cc of resin prepared according to an embodiment herein at a temperature of 38° C. Elution had a flow rate 160 mL/min, empty bed contact time (EBCT) 7.5 sec using feed water of de-chlorinated tap water.

In addition, the flat iodine elution profiles observed using the resins according to the present disclosure was temperature independent. For example, the iodinated anion exchange resin prepared according to the methods herein may display an iodine leakage elution profile of less than about 2 ppm over a temperature range of from about 0° C. to about 50° C. FIG. 4 displays the comparative iodine elution profiles of commercial MCV® resin and a resin prepared as described herein at an elution temperature of 38° C. The iodine elution profile of the resin prepared herein remains essentially flat over the entire elution volume. Since many sites where water treatment may be needed are located in tropical and subtropical environments, where temperatures may generally be high and range in the upper thirties (° C.) and even above 40° C., temperature independent iodine elution profiles may be desired.

According to other embodiments, the present disclosure provides a method for producing an iodinated anion exchange resin. According to these embodiments, the method comprises treating a chloride form anion exchange resin, such as a strong basic anion exchange resin, with an aqueous solution of a first soluble iodide salt to form an iodide loaded anion exchange resin, forming an aqueous solution of iodine ($I_2$) in situ by reacting an aqueous solution of a second soluble iodide salt with a source of chlorine ($Cl_2$), and treating or contacting the iodide loaded anion exchange resin with the aqueous solution comprising in situ formed $I_2$ to produce the iodinated anion exchange resin. The in situ formed iodine may be formed in the presence of the iodide loaded resin or, alternatively may be formed prior to contact with the iodide loaded resin. According to these methods, the chloride form anion exchange resin, the first soluble iodide salt, the second soluble iodide salt and the source of chlorine may be as described herein. The method may include any of the process steps (concentrations, times and temperatures) as described in detail herein. In certain embodiments, the first soluble iodide salt may be the same or different that the second soluble iodide salt. In certain embodiments, the first soluble iodide salt and/or the second soluble iodide salt may potassium iodide, sodium iodide, or a combination thereof. According to specific embodiments, the source of chlorine may be trichloroisocyanuric acid (TCCA).

Certain embodiments of the present disclosure may include a one-pot method for producing the iodinated anion exchange resin from a strong basic anion exchange resin, such as a chloride form anion exchange resin. According to these embodiment, the forming the iodide loaded resin and the forming the iodinated resin may be done in the same reaction vessel. For example, a chloride form ion exchange resin may be placed in an aqueous solution of excess soluble iodide salt to form the iodide loaded resin. Subsequently, and without isolation of the iodide loaded resin, a chlorine source, such as TCCA may be added to the aqueous solution of the soluble iodide salt to form in situ aqueous iodine. The iodine may then bind to the iodide at the resin active site to form the iodinated resin, as described herein. According to these embodiments, the iodinated resin may then be removed from the reaction medium and may be used as a part of a water treatment system.

Iodinated anion exchange resins used in water treatment systems may eventually lose effectiveness due to the reaction and/or elution of iodine from the iodinated resin over time. Once an iodinated resin loses its effectiveness, it must either be replaced or regenerated. Regeneration offers an economical way to restore activity of the iodinated resin as lower cost that purchasing resin materials. Iodinated resins may be regenerated using techniques in the art, for example by dissolving iodine crystals in water and treating the used resin to the solution to regenerate the iodinated resin, see U.S. Pat. No. 5,176,836. Alternatively, according to certain embodiment, the present disclosure provides for a method of regenerating a used iodinated anion exchange resin by treating the used resin to an aqueous solution of in situ generated iodine as described herein. The method may comprise treating an iodide loaded used anion exchange resin in which the iodine loading levels have decreased due to use and/or age such that the ability of the resin to remove microbiological contaminants from water is compromised, with an aqueous solution comprising in situ formed aqueous iodine, prepared as recited herein, to regenerate the iodinated anion exchange resin. According to certain embodiments, the in situ formed aqueous iodine may be formed by reacting a soluble iodide salt with a source of a molecular halogen in an aqueous solution. The resin may be treated by flowing a solution of in situ formed iodine over the resin for a time sufficient to regenerate the resin. Alternatively, the resin may be treated by placing in a solution of an iodide salt and then treating with a halogen source, as described herein, to form aqueous iodine in situ. In certain embodiments, the used iodinated anion exchange resin may be depleted of both the poly-iodine chains and the iodide anions located at the active site. For example, other anions may have replaced a portion, and in some cases a majority of the iodide anion residues at the active site. According to this embodiment, the used iodinated anion exchange resin may be re-loaded with iodide anion residues by treating the used iodinated anion exchange resin with an aqueous solution of a first soluble iodide salt to form the iodide loaded resin. The aqueous solution of the first soluble iodide salt may be as described herein, and may be the same or different than the soluble iodide salt used during the in situ formation of aqueous iodine.

Certain embodiments of the present disclosure provide for iodinated anion exchange resins which may be produced by any of the various embodiments of the methods described herein. In specific embodiments, the iodinated anion exchange resins may display an iodine leakage of less than 2 ppm during the entire elution period at a temperature ranging from about 0° C. to about 50° C. when eluting water through the iodinated anion exchange resin. In certain embodiment, the iodinated anion exchange resin may comprise active sites comprising primarily $I_3^-$ and $I_5^-$ poly-iodide chains and having from about 20% to 60% (% w/w) iodine or even about 40% to about 50% (% w/w) by weight iodine loading.

Still other embodiments of the present disclosure provide for methods of treating water. According to these embodiments, the methods may comprise the steps of eluting water comprising at least one contaminant through the iodinated anion exchange resin prepared or regenerated by a process according to any of the various embodiments described herein. According to one embodiment, the iodinated anion exchange resin may be prepared or regenerated by a process comprising treating an iodide loaded anion exchange resin with an aqueous solution comprising in situ formed $I_2$ to form the iodinated anion exchange resin, wherein the $I_2$ is formed in situ by reacting a soluble iodide salt with a source of a molecular halogen in an aqueous solution. According to these embodiments, the water may comprise at least one contaminant including, but are not limited to, viruses, such as enteroviruses, rotaviruses and other reoviruses, adenoviruses Norwalk-type agents, other microbes including fungi, bacteria, flagellates, amoebae, Cryptosporidium, Giardia, and other protozoa. According to certain embodiments, the treated water may display a viral Log reduction value of at least 4 and a bacterial Log reduction value of at least 6. These values may be observed at generally operating temperatures and pH, for example at temperatures of at least 4° C. and at a pH of at least 5. Embodiments of the methods for treating water may include eluting the water comprising at least one contaminant through the iodinated anion exchange resin wherein the resin is a part of a water treatment system, such as described herein.

Figure 5:
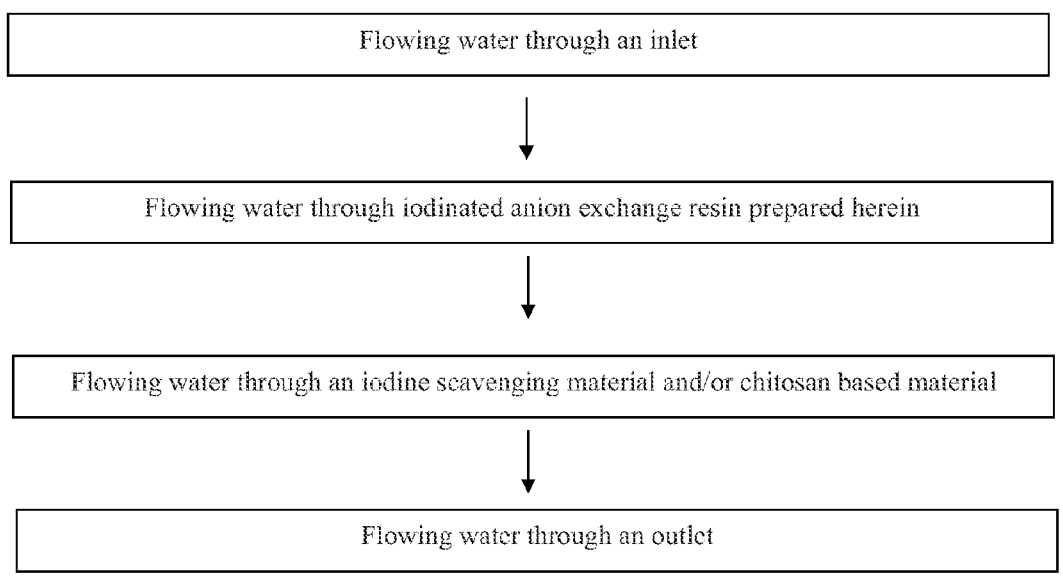
FIG. 5 illustrates a method for treating water with an iodinated anion exchange resin as prepared according to an embodiment herein.

Referring to FIG. 5, in certain embodiments of the method of treating water comprising at least one contaminant by an iodinated resin prepared as described herein may comprise flowing water sequentially through an inlet in fluid communication with an outlet, an iodinated anion exchange resin prepared according to the methods herein, wherein the iodinated anion exchange resin is intermediate the inlet and the outlet, at least one halogen scavenger barrier intermediate the iodinated anion exchange resin and the outlet, wherein the water may have a halide ion concentration of 0 ppm halide ion downstream from the scavenger barrier. The scavenger barrier may comprise at least one scavenger barrier to adsorb or absorb halogens, and/or react with or provide catalytic reaction sites for halogens to convert the halogens to an ionic form. In certain embodiment, the scavenger barrier may be selected from the group consisting of carbon, such as activated carbon, and an ion exchange resin, such as a strong-base anion exchange resin. Activated carbon may comprise any suitable form, such as, for example, carbon pellets, carbon powder, and granular carbon. In various embodiments, the scavenger barrier may comprise granular activated carbon (GAC). In various embodiments, the scavenger barrier may comprise a halogen scavenger barrier, such as, for example, an iodine scavenger resin. In various embodiments, the scavenger barrier may comprise strong-base anion exchange resins, such as, for example, Iodosorb®, available from Water Security Corporation, Sparks, Nev., as described in U.S. Pat. No. 5,624,567. Briefly, Iodosorb®, sometimes referred to as an iodine scavenger resin, comprises trialkyl amine groups each comprising alkyl groups containing 3 to 8 carbon atoms which is capable of removing halogens, including iodine or iodide, from aqueous solutions. In various embodiments, the scavenger barrier may comprise a halogen scavenger barrier and GAC, wherein the GAC is intermediate the halogen scavenger barrier and the outlet.

In other embodiments, the method may further comprise flowing the water through a chitosan based material, wherein the chitosan based material is intermediate the iodinated anion exchange resin and the outlet. For example, suitable chitosan and chitosan derivatives are described in U.S. Ser. Nos. 13/053,939 to Theivendran et al.; 13/069,029 to Theivendran et al.; and 61/595,294 to Theivendran et al. (filed Feb. 6, 2012), the disclosures of each of which are incorporated herein by this reference. The chitosan-base materials may be included, for example, to provide reduced halogen shortage and reduced halide leakage.

According to various embodiment, the present disclosure provides a water treatment system that comprises an iodinated anion exchange resin prepared or regenerated by a process as described herein. For example, the water treatment system may comprise at least one column or compartment comprising the anion exchange resin. According to one embodiment, the iodinated anion exchange resin may be prepared or regenerated by a process comprising treating an iodide loaded anion exchange resin with an aqueous solution comprising in situ formed $I_2$ to form the iodinated anion exchange resin, wherein the $I_2$ is formed in situ by reacting a soluble iodide salt with a source of a molecular halogen in an aqueous solution. The water treatment system may comprise a water inlet, a water outlet and an iodinated anion exchange resin, prepared by a process herein, intermediate the water inlet and the water outlet. For example, certain embodiments may include a water treatment system for providing potable water. The water treatment systems may generally comprise a filter comprising at least one iodinated anion exchange resin prepared according to the methods described herein and a halogen (iodine) scavenger barrier and/or a chitosan-based material as described in U.S. Ser. Nos. 13/053,939; 13/069,029; and/or 61/595,294. According to these embodiments, the iodinated anion exchange resin may be intermediate the inlet and the outlet and the halogen scavenger barrier and/or chitosan-based material may be located intermediate the iodinated resin and the outlet. In various embodiments, the water treatment system may comprise a point-of-use water treatment system comprising an iodinated anion exchange resin, a chitosan-based material, a halogen scavenger barrier, and/or granular activated carbon. In various embodiments, the point-of-use water treatment system may comprise a self-contained unit that may be used to treat water from untreated sources and/or a self-contained unit, such as a countertop, refrigerator or other unit, which may be used to treat tap water. Certain embodiments may specifically exclude municipal sewage and/or industrial wastewaters and runoff. In various embodiments, the effluent from a water treatment system may be at least one of free, substantially, and completely free from iodine, iodide, chloride, and/or chlorine. As used herein, the term "substantially free" means that the material is present, if at all, as an incidental impurity. As used herein, the term "completely free" means that the material is not present at all (up to experimental error associated with the measuring protocol).

In addition, the water treatment systems may be capable of removing significantly all of microbial contaminants present in the treated water. For example, eluting water comprising at least one viral or bacterial contaminant through the resin may result in a Log reduction value of viruses of at least 4 and a Log reduction value for bacteria of at least 6, at a temperature of at least 4° C. and a pH of at least 5.

Figure 6A:
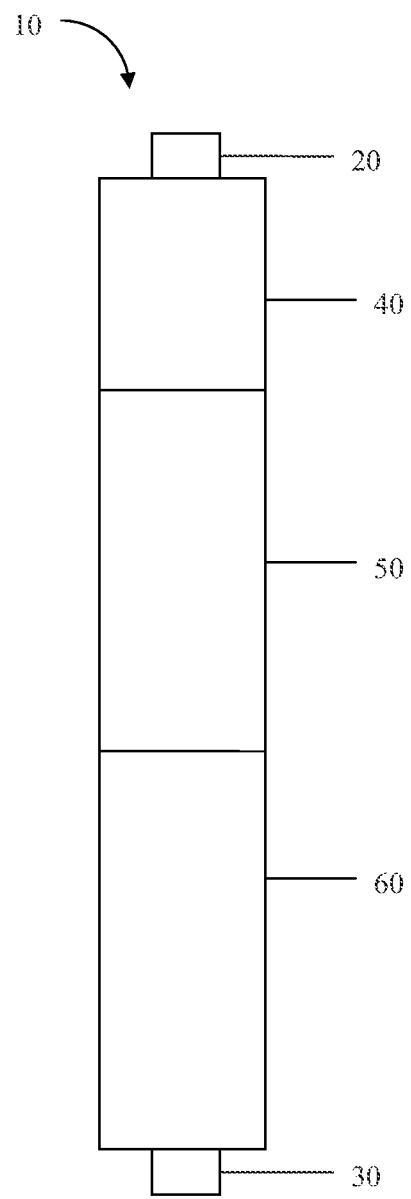

Referring to FIGS. 6A-B, in various embodiments, illustrate a water treatment system to provide potable water as described herein. According to these embodiments, the water treatment system comprise filter 10 which may generally comprise an inlet 20 in fluid communication with an outlet 30, an iodinated anion exchange resin 40, as prepared herein, intermediate the inlet 20 and the outlet 30, and a chitosan-based material 50 intermediate the halogen release system 40 and the outlet 30; and/or a halogen scavenger barrier 60 intermediate the halogenated chitosan 50 and the outlet 30. Referring to FIG. 1C, in certain embodiments, the water treatment system comprising a filter 10 may generally consist of an inlet 20 in fluid communication with an outlet 30, and an iodinated anion exchange resin 40 intermediate the inlet 20 and the outlet 30. In various embodiments, chitosan-based material 50 may comprise chitosan or chitin that has been prepared as described in U.S. Ser. Nos. 13/053,939 to Theivendran et al.; 13/069,029 to Theivendran et al.; and 61/595,294, and the scavenger barrier 60 may comprise an ion exchange resin, such as Iodosorb®, and/or GAC.

In certain embodiments, the water treatment system may comprise a housing (not shown). The housing may comprise a longitudinal axis along the z-axis wherein at least one of the inlet, outlet, iodinated anion exchange resin, chitosan-based material, and scavenger barrier, may be axially aligned along the longitudinal axis. The direction of fluid flow may be from the inlet towards the outlet along the longitudinal axis. The housing may comprise any suitable material, such as, for example, but not limited to, glass, metal, ceramic, plastic, and any combination thereof. In at least one embodiment, the housing material may not be permeable to aqueous and/or non-aqueous liquids. The housing may comprise any suitable shape, such as, for example, but not limited to, a polyhedron, a non-polyhedron, and any combination thereof. In at least one embodiment, the housing may comprise a generally cylindrical shape.

Referring to FIG. 7, one embodiment of a method for manufacturing a water treatment system is presented. According to this embodiment, a method of manufacturing a water treatment system comprising an iodinated anion exchange resin is described. In these embodiments, the method for manufacturing the water treatment system may comprise producing an iodinated anion exchange resin according to any of the embodiments described herein, and positioning the iodinated anion exchange resin intermediate an inlet and an outlet, wherein the inlet, the iodinated anion exchange resin, and the outlet are in fluid communication. In one embodiment, producing the iodinated anion exchange resin may include treating an iodide loaded anion exchange resin with an aqueous solution comprising in situ formed aqueous iodine to form the iodinated anion exchange resin, wherein the $I_2$ is formed in situ by reaction a soluble iodide salt, such as KI or NaI, with a source of a molecular halogen, such as a source of $Cl_2$, in an aqueous solution. In various embodiments, the water treatment system may comprise at least one chitosan-based material and/or at least one scavenger barrier, and positioning the at least one chitosan-based material and/or the at least one scavenger barrier intermediate the iodinated resin and the outlet. In various embodiments, the water treatment system may comprise GAC intermediate the ion exchange resin and the outlet.

In certain embodiments, the fluid contacting the iodinated anion exchange resin may have a fluid velocity less than 0.5 cm/s. In at least one embodiment, the fluid velocity may be between 0.3 cm/s and 0.5 cm/s. In at least one embodiment, the fluid velocity may be less than 0.3 cm/s. In at least one embodiment, the fluid velocity may be between 0.15 cm/s and 0.24 cm/s. In at least one embodiment, the fluid velocity may be less than 0.15 cm/s. In at least one embodiment, the fluid velocity may be greater than 0.5 cm/s.

These and other features of the various embodiments of the present disclosure will become more apparent upon consideration of the following examples. The various embodiments of this disclosure described in the following examples are not to be considered as limiting the invention to their details.

EXAMPLES

As generally used herein, the terms "ND" refers to not detectable or below the detection limit and "NA" refers to not applicable For the present examples, chemicals were obtained from the following sources, although other sources are possible. The strong base anion exchange resin (DOWEX™ SBR C Anion Exchange Resin, CAS #069011-19-4)) was obtained from The Dow Chemical Company, Midland, Mich. Potassium iodide was obtained as a 45% (wt %) aqueous solution (CAS#7681-11-0) from Deep Water Chemicals, Subsidiary of Tomen America Inc., Woodward, Okla. and diluted as required. Trichloroisocyanuric acid (TCCA, CAS#87-90-1) was obtained from Acros Organics, Fair Lawn, N.J., having 99% trichloroisocyanuric acid, a molecular weight of 232.41 g, and a solubility in water of 12 g/L. Iodine crystals USP (CAS#7553-56-2) were obtained from Deep Water Chemicals, Subsidiary of Tomen America Inc., Woodward, Okla.

Example 1

Production of Iodinated Resin a) Preparation of Iodinated Anion Exchange Resin Using In Situ Formed Iodine In this Example, an iodinated anion exchange resin was prepared according to one embodiment of the present disclosure and comparative MCV® resin was prepared according to the prior art.

Iodide loading—DOWEX™ SBR C anion exchange resin (100 cc) was placed in a 1 L glass bottle and treated with iodide to remove chloride ions. A 1% (wt %) aqueous solution of KI (127.1 mL) was added to the bottle and the mixture agitated by tumbling for 1 hr and the supernatant removed. Next, a 7% (wt %) aqueous solution of KI (127.1 mL) was added to the bottle and the mixture agitated by tumbling for 1 hr and the supernatant removed. Next, a 16% (wt %) aqueous solution of KI (127.1 mL) was added to the bottle and the mixture agitated by tumbling for 1 hr and the supernatant removed. Next, a 10% (wt %) aqueous solution of KI (127.1 mL) was added to the bottle and the mixture agitated by tumbling for 1 hr and the supernatant removed. The resulting resin was submitted to the iodination step.

Iodination by in situ Iodine Formation—To the iodide loaded DOWEX™ SBR C resin in the 1 L glass bottle was added 100 mL of a 20% (wt %) aqueous solution of KI. TCCA solid (7 g) was slowly added and the mixture agitated by tumbling for 20 min and the supernatant removed. This process was repeated by adding 100 mL of 20% (wt %) KI (aq) followed by gently adding 7 g of TCCA, tumbling for 20 min and removal of the supernatant. The process was repeated a third time by adding 100 mL of 20% (wt %) KI (aq) followed by gently adding 7 g of TCCA, tumbling for 20 min and removal of the supernatant. The resulting iodinated resin was washed three times using 1 L of deionized (DI) water each time. The process uses a total iodine of about 42.3 g. The iodine reading after 30 minutes of the iodination process was 1.0 to 2.0 ppm. The total process time, including iodide loading and iodination is approximately 5 hr.

b) Comparative Example—Preparation of MCV® Resin Using Iodine Crystal

Iodide loading—DOWEX™ SBR C anion exchange resin (100 cc) was placed in a 1 L glass bottle and treated with iodide to remove chloride ions using the same process used in Example 1, part (a), except after the tumbling step in the fourth iodide loading step, the resin-liquor was allowed to equilibrate and the supernatant was not removed. This slurry was submitted directly to the iodination step.

Iodination with $I_2$ Crystals—To the slurry from the iodide loading process was added iodine crystals ($I_2$(s), 35.31 g) and the mixture tumbled for 30 min. Next an additional 21.19 g of I2(s) was added to the slurry and the mixture was tumbled for 15 min/hr over 16 hr. The supernatant was removed and the resulting iodinated resin was washed three times using 1 L of deionized (DI) water each time. The process uses a total iodine of about 56.5 g, or greater than 20% more iodine by weight that the in situ loading process detailed herein. The small column test for iodine reading after 30 minutes of the iodination process was 3.5 to 4.5 ppm. The total process time, including iodide loading and iodination is approximately 20 hr, or about four-time longer than the in situ loading process described herein.

c) Iodine Loading Comparison—Testing

The resin prepared using in situ iodination loading process according the one embodiment herein and the MCV® resin prepared using the prior art crystalline 12 loading process were analyzed for iodine loading by Glabraith Laboratories, Knoxyille, Tenn. using GLI Procedure E35-2. Iodinated resin prepared by in situ iodine formation described herein had an iodine loading of 42.59%. MCV® iodinated resin prepared using crystalline $I_2$ had an iodine loading of 67.63%. The resin prepared using in situ formed iodine shows a loading of less than 25% iodine compared to commercially available MCV®.

d) Regeneration from Used Iodinated Anion Exchange Resin

The iodinated anion exchange resin prepared using in situ formed iodine may be regenerated after the activity of the resin has diminished. Regeneration allows for the renewal and reuse of the resin and provides economic savings over production of new resin. The resin may be regenerated using procedures known in the art, such as U.S. Pat. No. 5,176,836, which is incorporated by reference herein. Alternatively, the resin may be regenerated using in situ formed iodine according to one of the following processes.

Method 1—A concentrated aqueous iodine solution (250-300 ppm) is made by reacting in situ a stoichiometric ratio of KI (aq) with a chlorine source, such as TCCA. The iodine solution is passed through a bed of the used iodinated resin in need of regeneration. Sufficient iodine solution is passed through the resin until the resin displays an activity about equal to the activity of new iodinated resin.

Method 2—The used resin in need of regeneration is placed in a glass mixing vessel. A 20% (wt %) aqueous solution of KI is added to the used resin and the slurry tumble. TCCA solid is slowly added in an amount sufficient to convert the KI to iodine in situ. The mixture is agitated by tumbling for 20 min and the supernatant removed. The process may be repeated as necessary until the resin displays an activity about equal to the activity of new iodinated resin.

Example 2

Iodine Leakage Comparison

The iodine and iodide elution of iodinated resin prepared according to Example 1 was compared with commercially available MCV® iodinated resin (MCV Manufacturing, Inc., Sparks Nev.). Three iodine leakage comparisons were performed: a) 20 cc resin at room temperature and b) 10 cc resin at room temperature. The iodine ($I_2$) concentration was measured by the leuco-crystal violet method 4500-I B and the iodide ($I^-$) concentration was measured by the leuco-crystal violet method 4500-$I^-$ B as described in "Standard Methods for the Examination of Water and Wastewater," American Water Works Association, 21$^{st}$ edition (2005), pp. 4-95 and 4-98.

a) Iodine and Iodide Elution for 20 cc of Resin at 23° C.

Iodine and iodide elution was measured for 20 cc of iodinated resin prepared according to Example 1 and for 20 cc of commercially available MCV® iodinated resin. Dechlorinated tap water was eluted through each resin at a flow rate of 178 mL/min and EBCT of 6.75 and a temperature of 23° C. The resulting values for iodine elution for the resins is presented in FIG. 2. Commercially available MCV® resin displayed increased $I_2$ elution over the first 2000 L of feed volume. After about 2000 L of feed volume both resins displayed similar iodine elution up to 3000 L. Iodide elution for both resins ranged between about 0.6 ppm to about 2.2 ppm over the entire elution volume.

b) Iodine and Iodide Elution for 10 cc of Resin at 23° C.

Iodine and iodide elution was measured for 10 cc of iodinated resin prepared according to Example 1 and for 10 cc of commercially available MCV® iodinated resin. Dechlorinated tap water was eluted through each resin at a flow rate of 160 mL/min and EBCT of 3.75 and a temperature of 23° C. The resulting values for iodine elution for the resins is presented in FIG. 3. Commercially available MCV® resin displayed increased $I_2$ elution over the first 850 L of feed volume. After about 850 L of feed volume both resins displayed similar iodine elution up to 2000 L. After 2000 L the iodinate resins prepared according to the present methods eluted iodine at a slightly lower concentration. Iodide elution for both resins was similar over the entire elution volume.

Example 3

Iodine Elution at Elevated Temperature

Many areas where water contamination is a problem are located in tropical and subtropical environments where atmospheric temperatures may range from the mid 30°'s to the 40°'s (Celsius). For a successful water treatment system, it is desired that iodine elution levels from the iodinated resin are not affected by increased temperatures. In this example, the iodine leakage of an iodinated resin prepared according to the present disclosure and a commercially available MCV® were compared at elevated temperatures.

Iodine and iodide elution was measured for 20 cc of iodinated resin prepared according to Example 1 and for 20 cc of commercially available MCV® iodinated resin. Dechlorinated tap water was eluted through each resin at a flow rate of 178 mL/min and EBCT of 6.75 and a temperature of 38° C. The resulting values for iodine elution for the resins are presented in FIG. 4. Commercially available MCV® resin displayed increased $I_2$ elution over the first 1200 L of feed volume. After about 1200 L of feed volume both resins displayed similar iodine elution up to 2300 L.

Example 3

A challenge experiment may be used to determine the ability of a water treatment system to reduce contaminants from a fluid. A challenge, or a known quantity of a selected microbiological contaminant, may be added to the influent. The virus MS2 coliphage (ATCC 15597-B1) was chosen as the microbiological contaminant. The amount of the contaminant in the influent and effluent may be measured to determine the filtration capacity or microbial inactivation capacity of the water treatment system comprising an iodinated resin prepared according to the methods described herein, compared to a commercially available iodinated resin. The resin prepared as described herein displays comparable removal values as commercially available resins.

A challenge experiment of certain embodiments of the water treatment systems including an iodinated resin prepared in Example 1(a) was compared to conventional water treatment systems comprising an MCV® iodinated resin. A Log reduction value (Log PFU/mL) of 5 for MS2 in 3000 mL de-chlorinated tap water at room temperature was introduced to the water treatment system via the inlet and dispensed through the outlet. The influent and effluent were tested for MS2 coliphage before and after contact with the water treatment systems. The resins (20 cc) were aged at 23° C. and 160 mL/min flow rate up to 1400 L and then challenged with the MS2 water system at room temperature (23° C.). The feed water flow rate remained at 160 mL/min with a total feed volume of water of 3000 L.

The results of a challenge experiment of a water treatment system comprising iodinated resins prepared in Example 1(a) and MCV® iodinated resin are shown in Table 1 for resin aged at room temperature. The MS2 removal by MCV® and the present iodinated resin were similar with 1.3 and 1.5 Log PFU/mL of removal at 3000 L (SE=±0.5), respectively. The iodine elution at this point was 0.5 for the resin from Example 1(a) and MCV® resin.

TABLE 1

MS2 Removal Iodinated Resin at
3000 L feed volume (aged at 23° C.)

| Feed volume 3000 L | Treatment MS2 Log removal (Log PFU/mL) | | |
|---|---|---|---|
| | Influent | Effluent | Removal |
| MCV (20 CC) | 5.23 | 3.95 | 1.28 |
| Ex 1(a) Iodinated resin | 5.23 | 3.78 | 1.45 |

Example 4

A second challenge experiment may be used to determine the ability of a water treatment system to reduce contaminants from a fluid when the resin has been aged at higher temperature. This example shows that the resin prepared herein shows acceptable micorbiologic removal values even after sitting at high temperatures, such as those associated with tropical or sub-tropical locales. The virus MS2 coliphage (ATCC 15597-B1) was chosen as the microbiological contaminant.

A challenge experiment of certain embodiments of the water treatment systems including an iodinated resin prepared in Example 1(a) was compared to conventional water treatment systems comprising an MCV® iodinated resin. A Log reduction value (Log PFU/mL) of 5 for MS2 in 3000 mL de-chlorinated tap water at room temperature was introduced to the water treatment system via the inlet and dispensed through the outlet. The influent and effluent were tested for MS2 coliphage before and after contact with the water treatment systems. The resins (20 cc) were aged at 38° C. and 160 mL/min flow rate up to 1400 L and then challenged with the MS2 water system at room temperature (23° C.). The feed water flow rate remained at 160 mL/min with a total feed volume of water of 5000 L.

The results of a challenge experiment of a water treatment system comprising iodinated resins prepared in Example 1 and MCV® iodinated resin are shown in Table 2. The MS2 removal by MCV® and the present iodinated resin were similar with 1 Log PFU/mL of removal at 1400 L (SE=±0.5). The 1400 L can be assumed as an end of capacity level of discovery (mimic 30,000 gallons). The iodine elution at this point was 1.5 for the resin from Example 1 and 1.2 for MCV® resin. The discovery residential time of 11 min. was sufficient to result in a kill of up to 4 Log PFU/mL (MS2 removal).

TABLE 2

MS2 Removal Iodinated Resin at
1400 L feed volume (aged at 38° C.)

| Feed volume 1400 L | Treatment MS2 Log removal (Log PFU/mL) | | |
|---|---|---|---|
| | Influent | Effluent | Removal |
| MCV (20 CC) | 5.46 | 4.26 | 1.21 |
| Ex 1(a) Iodinated resin | 5.46 | 4.46 | 1.00 |

Example 5

Out Gassing

Commercially available iodinated resins may display iodine evaporation during extended storage. Out gassing of iodine was observed when commercially available MCV® resin is stored at elevated temperature (50° C.) conditions as observed by the packaging materials turning a yellowish brown color due to iodine evaporation into the packaged atmosphere. Under similar conditions, iodinated resin prepared using the in situ iodine formation processes described herein displays no change in the color of the packaging materials after storage at elevated temperature conditions after 20 days.

Example 6

Residual Chlorine Determination

Since the resin preparation method described herein uses chlorine as an oxidative agent to convert iodide (KI) to iodine. For the quality assurance purposes the prepared resin elution was evaluated for the presence of chlorine residuals. The results showed there no chlorine ($Cl_2$) elution from the present resin. That indicates there are no chlorine residuals in the prepared present resin.

Chlorine can interfere with the iodine ($I_2$) evaluation when using spectrophotometry. Spectrophotometer/DPD (for measuring chlorine content) methods cannot be used to predict the actual amount of iodine ($I_2$) or chlorine ($Cl_2$) when both presence in the same solution. Both methods can be interrupted by each other molecules. Therefore, the following procedure for determining the presence/absence of chlorine in the solution was developed.

Step 1: Collect present resin effluent (Feed water passed through the resin)—Keep as two portions;
Step 2: Determine the iodine ($I_7$) and total iodine (TI) using standard method (using one portion);
Step 3: Calculate the iodide in the solution (TI-$I_2$):
Step 4: Prepare chlorine solution at 0.1 ppm;
Step 5: Add this chlorine solution (0.1 ppm) solution to second portion of the collected effluent (first portion already been used for Iodine/Iodide determination) as 1:1 ratio. Mix thoroughly;
Step 6: Determined the Iodide ($I^-$) concentration of the solution from step 5;
Step 6: If the iodide ($I^-$) concentration from Step 6 is lower than half of the iodide concentration from Step 3 then there is no chlorine content in the effluent. Since adding chlorine is converting iodide to iodine, that indicates that previously there is no residual chlorine presence in the effluent. If chlorine was present, it would have converted any iodide species to iodine initially.

Note:
1. Iodine/Iodide determined using standard methods (AWWA)
2. DPD method for chlorine determination All documents cited herein are incorporated herein by reference, but only to the extent that the incorporated material does not conflict with existing definitions, statements, or other documents set forth herein. To the extent that any meaning or definition of a term in this document conflicts with any meaning or definition of the same term in a document incorporated by reference, the meaning or definition assigned to that term in this document shall govern. The citation of any document is not to be construed as an admission that it is prior art with respect to this application.

While particular embodiments of water treatment systems have been illustrated and described, it would be obvious to those skilled in the art that various other changes and modifications can be made without departing from the spirit and scope of the invention. Those skilled in the art will recognize, or be able to ascertain using no more than routine experimentation, numerous equivalents to the specific apparatuses and methods described herein, including alternatives, variants, additions, deletions, modifications and substitutions. This application including the appended claims is therefore intended to cover all such changes and modifications that are within the scope of this application.

We claim:

1. A method for producing an iodinated anion exchange resin comprising:
    treating an iodide loaded anion exchange resin with an aqueous solution comprising in situ formed $I_2$ to produce an iodinated anion exchange resin,
    wherein the $I_2$ is formed in situ by reacting a soluble iodide salt with a source of molecular chlorine ($Cl_2$) or a source of molecular bromine ($Br_2$) in an aqueous solution.

2. The method of claim 1, where the pH of the aqueous solution comprising in situ formed $I_2$ is less than 7.8.

3. The method of claim 1, wherein the soluble iodide salt is selected from the group consisting of an alkali metal iodide salt, an alkaline earth metal iodide salt, a transition metal iodide salt, and mixtures of any thereof 4. The method of claim 3, wherein the soluble iodide salt is an alkali metal iodide salt.

5. The method of claim 4, wherein the soluble iodide salt is KI, NaI, or mixtures thereof.

6. The method of claim 1, wherein the $I_2$ is formed in situ by reacting the soluble iodide salt with a source of molecular chlorine ($Cl_2$).

7. The method of claim 6, wherein the chlorine producing source is selected from the group consisting of chlorine gas, trichloroisocyanuric acid (TCCA), sodium dichloroisocyanuriate, sodium hypochlorite, calcium hypochlorite, hypochlorous acid, and combinations of any thereof.

8. The method of claim 7 wherein the chlorine producing source is trichloroisocyanuric acid.

9. The method of claim 1, further comprising first treating a chloride form anion exchange resin with an aqueous solution of a first soluble iodide salt to form the iodide loaded anion exchange resin.

10. The method of claim 9, wherein the aqueous solution of a first soluble iodide salt is an aqueous solution of KI, NaI or mixtures thereof.

11. The method of claim 1, wherein the anion exchange resin comprises a plurality of quaternary ammonium cationic sites.

12. The method of claim 1, wherein the aqueous solution of I2 further comprises at least one chloride ion scavenger compound.

13. The method of claim 1, wherein the iodinated anion exchange resin displays iodine leakage of less than 2 ppm during the entire elution of water through the iodinated anion exchange resin at temperatures from about 0° C. to about 50° C.

14. A method for producing an iodinated anion exchange resin comprising:
    treating a chloride form anion exchange resin with an aqueous solution of a first soluble iodide salt to form an iodide loaded anion exchange resin;
    forming an aqueous solution of $I_2$ in situ by reacting an aqueous solution of a second soluble iodide salt with a source of $Cl_2$; and
    treating the iodide loaded anion exchange resin with the aqueous solution comprising in situ formed $I_2$ to produce an iodinated anion exchange resin.

15. The method of claim 14, wherein the soluble iodide salt is KI, NaI or mixtures thereof, and the source of $Cl_2$ is trichloroisocyanuric acid.

16. A method of regenerating a used iodinated anion exchange resin comprising:
    treating a used iodinated anion exchange resin with an aqueous solution of a first soluble iodide salt to form an iodide loaded used anion exchange resin; and
    treating the iodide loaded used anion exchange resin with an aqueous solution comprising in situ formed $I_2$ to produce a regenerated iodinated anion exchange resin, wherein the $I_2$ is formed in situ by reacting a second soluble iodide salt with a source of molecular chlorine ($Cl_2$) or a source of molecular bromine ($Br_2$) in an aqueous solution.

17. An iodinated anion exchange resin produced by the process according to claim 1, wherein when eluting water through the iodinated anion exchange resin, the resin displays an iodine leakage of less than 2 ppm during the entire elution period at a temperature range of from about 0° C. to about 50° C.

18. The iodinated anion exchange resin of claim 17, wherein the iodinated resin comprises active sites comprising primarily $I_3^-$ and $I_5^-$ sites.

19. A method of treating water comprising:
    eluting water comprising at least one contaminant through an iodinated anion exchange resin prepared or regenerated by the process of claim 1.

20. A water treatment system comprising:
    at least one column or compartment comprising an iodinated anion exchange resin prepared or regenerated by the process of claim 1.

21. The system of claim 20, wherein the resin has a Log reduction value for viruses of at least 4 and a Log reduction value for bacteria of at least 6 at a temperature of at least 4° C. and a pH of at least 5.

* * * * *